(12) United States Patent
Saje et al.

(10) Patent No.: US 9,394,008 B2
(45) Date of Patent: Jul. 19, 2016

(54) ROTATED SECTION STABILIZER

(71) Applicant: GM Global Technology Operations LLC, Detroit, MI (US)

(72) Inventors: Robert N. Saje, Shelby Township, MI (US); Steven C. Thieda, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 13/930,192

(22) Filed: Jun. 28, 2013

(65) Prior Publication Data

US 2015/0001823 A1   Jan. 1, 2015

(51) Int. Cl.
| | |
|---|---|
| B62D 27/02 | (2006.01) |
| B62D 25/20 | (2006.01) |
| B66F 7/18 | (2006.01) |
| B66F 7/28 | (2006.01) |

(52) U.S. Cl.
CPC .............. *B62D 25/2081* (2013.01); *B66F 7/18* (2013.01); *B66F 7/28* (2013.01)

(58) Field of Classification Search
CPC .... B62D 25/2081; B62D 25/025; B60S 11/00
USPC ........... 296/29, 30, 187.01, 209, 187.02, 205; 280/796–799
See application file for complete search history.

(56) References Cited

U.S. PATENT DOCUMENTS

| | | | | | |
|---|---|---|---|---|---|
| 2,327,585 | A | * | 8/1943 | Ulrich | 52/787.1 |
| 3,149,878 | A | * | 9/1964 | Heermann | B60P 3/32 296/102 |
| 3,838,868 | A | * | 10/1974 | Robertson | 280/656 |
| 4,302,874 | A | * | 12/1981 | Colas | 29/426.6 |
| 4,378,127 | A | * | 3/1983 | Rossi, Sr. | B62D 33/08 224/309 |
| 4,382,721 | A | * | 5/1983 | King | 405/288 |
| 4,452,657 | A | * | 6/1984 | Hamm | 156/198 |
| 4,763,878 | A | * | 8/1988 | Abraham et al. | 254/100 |
| 4,919,358 | A | * | 4/1990 | Innocenti et al. | 242/611 |
| 4,965,915 | A | * | 10/1990 | Steininger | 24/607 |
| 5,308,115 | A | * | 5/1994 | Ruehl et al. | 280/785 |
| 5,718,276 | A | * | 2/1998 | Rekret | 160/201 |
| 6,003,274 | A | * | 12/1999 | Wycech | 52/232 |
| 6,058,673 | A | * | 5/2000 | Wycech | 52/834 |
| 6,131,897 | A | * | 10/2000 | Barz et al. | 269/207 |
| 6,149,227 | A | * | 11/2000 | Wycech | 296/187.02 |
| 6,165,588 | A | * | 12/2000 | Wycech | 428/122 |
| 6,168,226 | B1 | * | 1/2001 | Wycech | 296/146.6 |
| 6,189,953 | B1 | * | 2/2001 | Wycech | 296/187.02 |
| 6,237,304 | B1 | * | 5/2001 | Wycech | 52/847 |
| 6,270,600 | B1 | * | 8/2001 | Wycech | 156/79 |
| 6,341,467 | B1 | * | 1/2002 | Wycech | 52/834 |
| 6,358,584 | B1 | * | 3/2002 | Czaplicki | 428/36.5 |
| 6,402,414 | B1 | * | 6/2002 | Kanodia et al. | 403/230 |
| 6,475,577 | B1 | * | 11/2002 | Hopton et al. | 428/34.7 |
| 6,618,988 | B2 | * | 9/2003 | Williams et al. | 47/17 |
| 6,896,320 | B2 | * | 5/2005 | Kropfeld | 296/203.01 |

(Continued)

FOREIGN PATENT DOCUMENTS

| | | | |
|---|---|---|---|
| DE | 3532375 C1 | * | 8/1986 |
| DE | 3627892 C1 | * | 10/1987 ............. B60S 11/00 |
| EP | 2020352 A2 | * | 2/2009 |

*Primary Examiner* — Dennis H Pedder
(74) *Attorney, Agent, or Firm* — BrooksGroup

(57) ABSTRACT

A product including a section stabilizer which may be inserted into a hollow section of a vehicle body and rotated into place which may add reinforcement to the area.

17 Claims, 4 Drawing Sheets

(56) References Cited

U.S. PATENT DOCUMENTS

| | | | |
|---|---|---|---|
| 7,350,450 B1* | 4/2008 | Chu et al. | 89/36.02 |
| 7,481,142 B2* | 1/2009 | Kelly | 83/581 |
| 7,690,721 B2* | 4/2010 | Gruneklee et al. | 296/203.01 |
| 8,530,015 B2* | 9/2013 | Mendiboure et al. | 428/36.5 |
| 8,641,131 B2* | 2/2014 | Honda et al. | 296/187.12 |
| 8,696,051 B2* | 4/2014 | Charbonneau et al. | 296/209 |
| 8,702,160 B2* | 4/2014 | Kurogi et al. | 296/205 |
| 2001/0030092 A1* | 10/2001 | Pribula et al. | 188/112 R |
| 2004/0045847 A1* | 3/2004 | Fairbank | 206/386 |
| 2006/0001285 A1* | 1/2006 | Patberg | 296/29 |
| 2007/0209314 A1* | 9/2007 | Vaughn | 52/720.1 |
| 2007/0262617 A1* | 11/2007 | Feith et al. | 296/205 |
| 2008/0230663 A1* | 9/2008 | Svehlek | 248/211 |
| 2009/0007520 A1* | 1/2009 | Navon | 52/837 |
| 2009/0066115 A1* | 3/2009 | Browne et al. | 296/187.03 |
| 2010/0207426 A1* | 8/2010 | Tsuruta et al. | 296/187.12 |

* cited by examiner

ROTATED SECTION STABILIZER

TECHNICAL FIELD

The field to which the disclosure generally relates to includes vehicle bodies.

BACKGROUND

A vehicle body may include one or more hollow structures.

SUMMARY OF ILLUSTRATIVE VARIATIONS

One variation may include a product comprising a section stabilizer which may be inserted into a hollow section of a vehicle body and rotated into place to add reinforcement to the area.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

One variation may include a product comprising a section stabilizer which may be inserted into a hollow section of a vehicle body and rotated into place to add reinforcement to the area.

Figure 1:
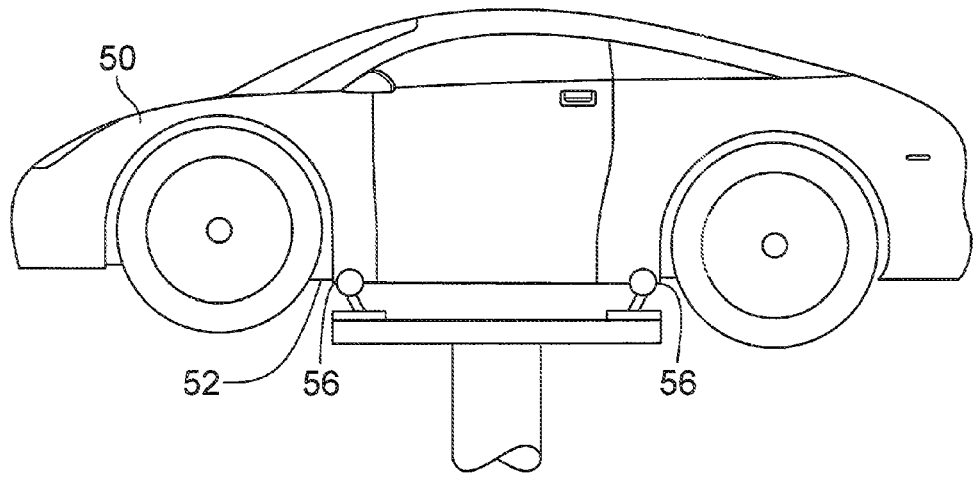
FIG. 1 depicts a vehicle on a hoist according to a number of variations.
Figure 2:
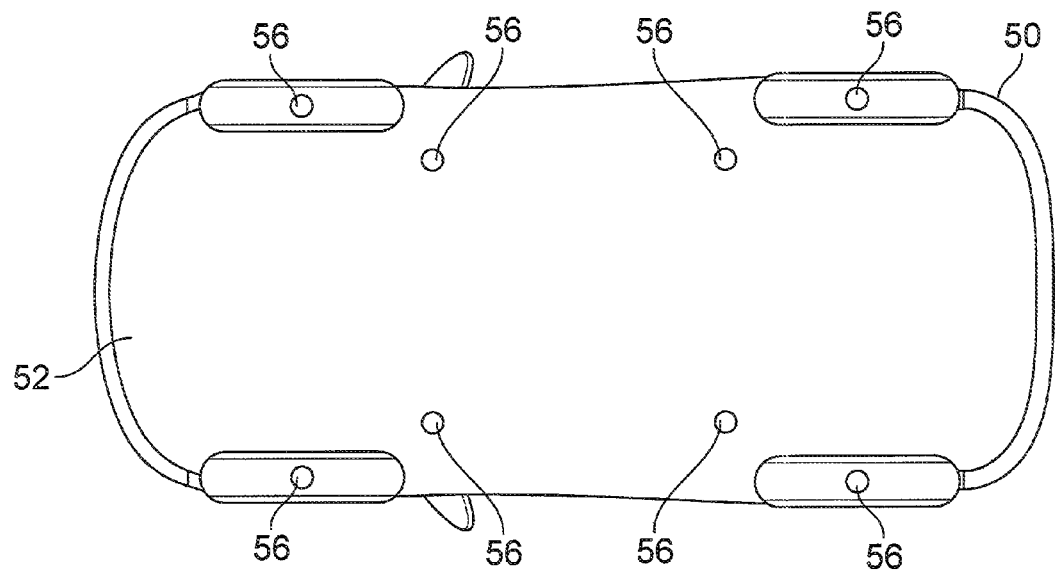
FIG. 2 depicts various vehicle jack and hoist underbody attachment points according to a number of variations.

Referring to FIGS. 1-2, a vehicle 50 may include an underbody 52. The underbody 52 may include several hollow structures 54. Various sections 56 of the hollow structures 54 of the underbody 52 may be subject to various loads or stress which may require local stiffness greater than what is required for other sections of the hollow structures 54 in order to prevent deformation or weakening of the hollow section 56. The sections 56 of the hollow structures 54 which may require greater stiffness may be located in any of a number of locations including, but are not limited to, the jack, hoist, or underbody cross-bracing attachment points.

Figure 3:
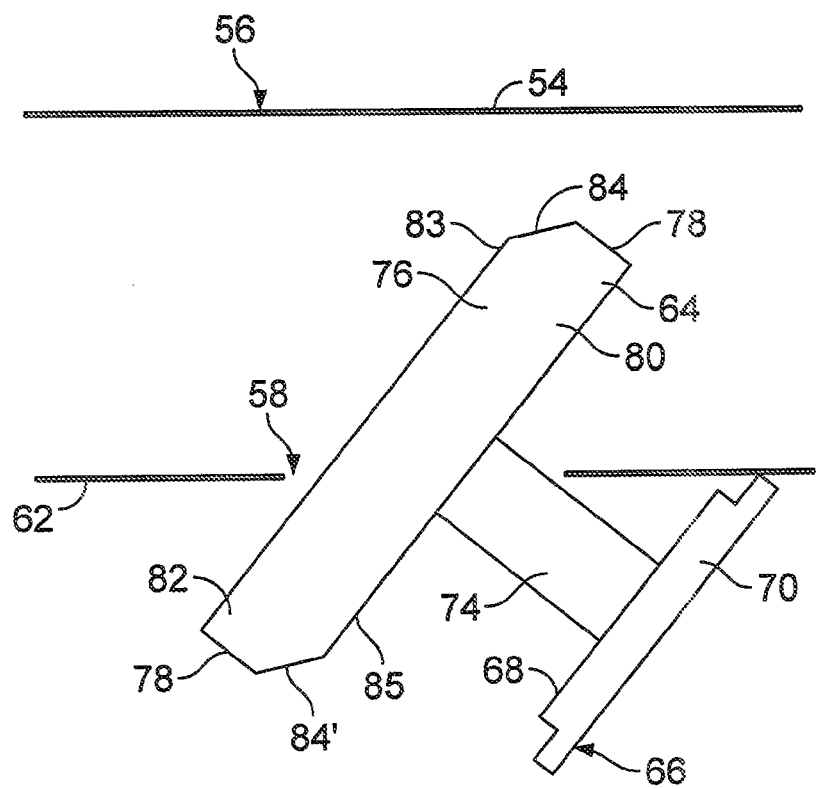
FIG. 3 depicts a section stabilizer according to a number of variations.
Figure 4:
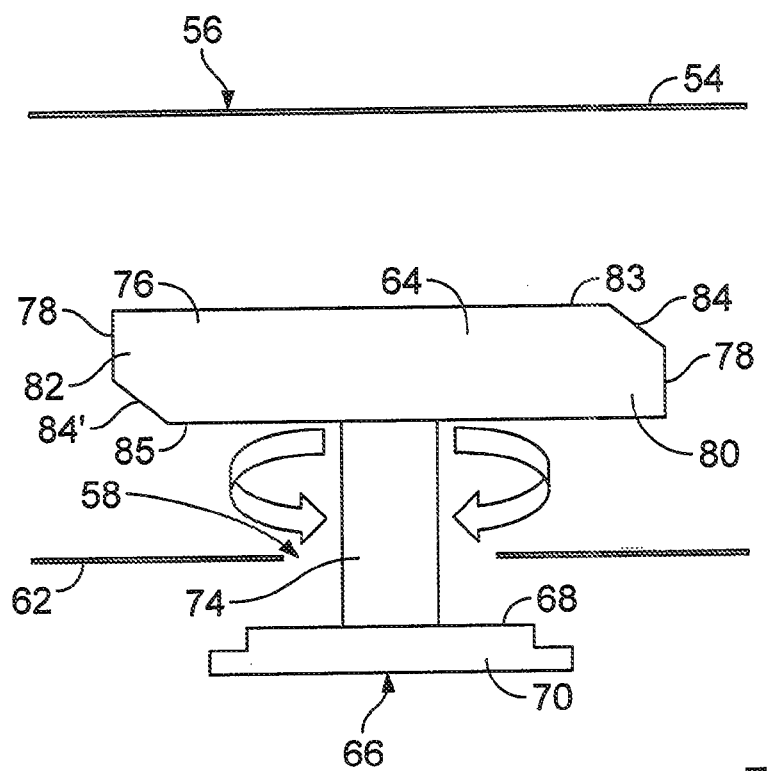
FIG. 4 depicts a section stabilizer according to a number of variations.

Referring to FIGS. 3-7, in any of a number of variations, a section stabilizer 64 may be used to reinforce various hollow sections 56 of the underbody 52 which may prevent weakening or deformation of the hollow structure 54. In one variation, a section stabilizer 64 may include a base structure 66, a riser or vertical support 74, and a lateral support pin 76, for example as illustrated in FIGS. 3-4. The base structure 66 may be any of a number of configurations including, but not limited to, a planar surface having an upper portion 68 and a lower portion 70. The upper portion 68 may be constructed and arranged to fit within a hole 58 in the hollow structure 54. The lower portion 70 of the base surface 66 may extend a distance past the hole 58 in the hollow structure 54. The lower portion 70 may be rectangular in shape and may be constructed and arranged to accommodate an underbody bracing attachment, a jack, or a hoist pad. The lower portion 70 edges may also be constructed and arranged to optimize metal inert gas (mig) welding efficiency. In another variation, the lower portion 70 may be circular in shape and may extend radially a distance past the diameter of the hole 58. In another variation, the lower portion 70 may be removed.

Figure 6:
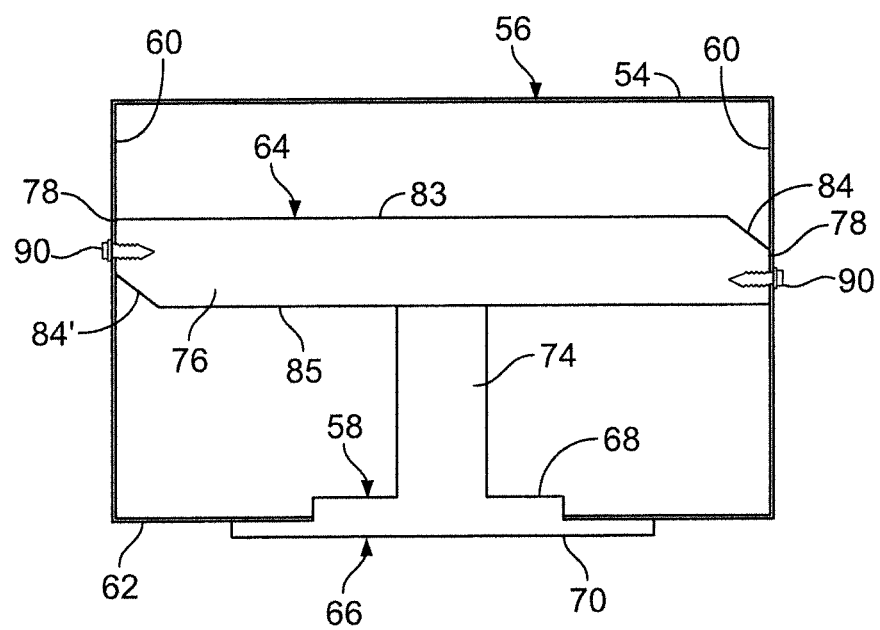
FIG. 6 depicts a section stabilizer according to a number of variations.

In a number of variations, the vertical support 74 may be cylindrical in shape and may extend upwards from the base structure 66. A lateral support pin 76 may be attached to the vertical support 74. The lateral support pin 76 may be cylindrical in shape and may be constructed and arranged to fit between opposing side walls 60 inside of a section 56 of a hollow structure 54. The lateral support pin 76 may also have two planar ends 78 which each include a chamfer 84, 84'. In a number of variations, one chamfer 84 may extend from a top surface 83 of the lateral support pin 76 and another chamfer 84' may extend from a bottom surface 85 of the lateral support pin 76. In a number of variations, the lateral support pin 76 may include a diameter large enough so that each planar end 78 may accept a flow drill screw 90, a variation of which is illustrated in FIG. 6. The section stabilizer 64 may be formed in any of a number of ways including, but not limited to, casting the section stabilizer 64 so that the section stabilizer 64 is one single component, or assembling a base component 66, a vertical support 74 component, and a lateral support pin 76 component together to form the section stabilizer 64.

Figure 5:
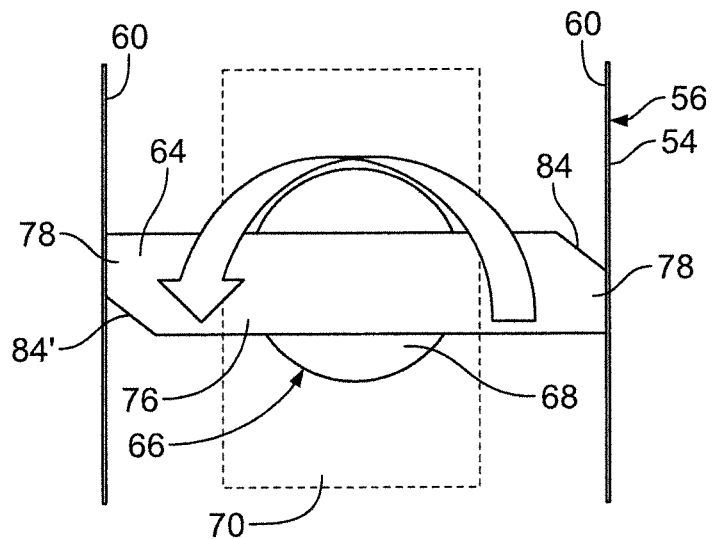
FIG. 5 depicts a top view of a section stabilizer according to a number of variations.

In one variation, a section stabilizer 64 may be inserted into a hollow section 56 of a hollow structure 54 via a hole 58 which exists in the hollow structure 54. The section stabilizer 64 may be inserted into the hole 58 at an angle so that the first portion 80 of the lateral support pin 76 enters into the hollow section 56 first, for example as illustrated in FIG. 3. The second portion 82 of the lateral support pin 76 may then be inserted into the hole 58 following the first end 80. The chamfers 84, 84' on the lateral support pin ends 78 may assist in the installation of the section stabilizer 64 into the hollow section 56 by guiding or clearing the stabilizer lateral support pin 76 relative to the hollow section walls which may help provide load/rotation clearance of the hollow section internal walls 60. The chamfers 84, 84' may also maintain a tight relationship between the lateral support pin ends 78 to the hollow section internal walls 60 for attachment via mig welding or flow drill screws 90. The base structure 66 may then be turned either clockwise or counter clockwise, for example as illustrated in FIG. 4, so that the lateral support pin ends 78 make contact with the hollow structure section internal side walls 60, for example as illustrated in FIG. 5. The base structure 66 may then be pushed upwards so that the base structure 66 is flush with the outer wall 62 of the hollow structure 54, for example as illustrated in FIG. 6.

Figure 7:
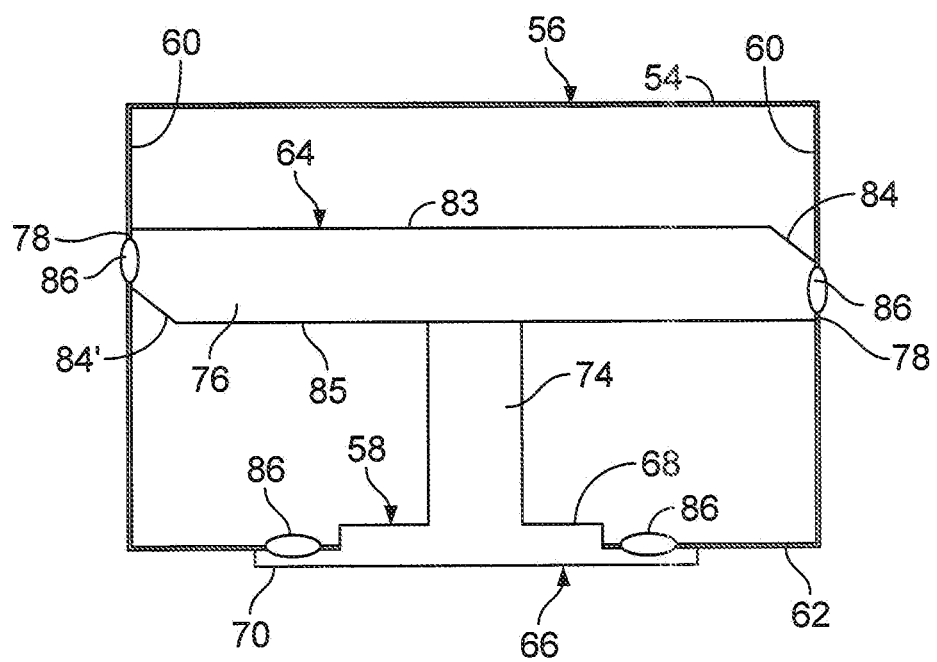
FIG. 7 depicts a section stabilizer according to a number of variations.

The section stabilizer 64 may be held into position in any of a number of variations. In one variation, the section stabilizer 64 may comprise aluminum and the hollow structure 54 may also comprise aluminum. In this variation, the lateral support pin ends 78 may be aluminum mig welded to the inner section walls 60 to provide a welded material or weld spot 86 joining the section stabilizer to the hollow structure 54, for example as illustrated in FIG. 7, via slots (not illustrated) that may be located on the hollow structure 54. The base structure 66 may also be aluminum mig welded 86 to the outer surface of the hollow structure section walls 62 to secure the section stabilizer 64 in place.

In another variation, the section stabilizer 64 may comprise aluminum and the hollow structure 54 may comprise steel. In this variation, the lateral support pin ends 78 may be attached to the section side walls 60, 62 via drilling flow drill screws 90 through the side walls 60, 62 and into the lateral support pin ends 78, a variation of which is illustrated in FIG. 6.

In yet another variation, the section stabilizer 64 may comprise steel and the hollow structure 54 may comprise steel. In this variation, the lateral support pin ends 78 may be steel mig welded to the inner section walls 60 to provide a welded material or weld spot 86 joining the section stabilizer to the hollow structure 54, for example as illustrated in FIG. 7, via slots (not illustrated) that may be located on the hollow structure 54. The base structure 66 may also be welded 86 to the outer surface of the hollow structure section walls 62 to secure the section stabilizer 64 in place.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a section stabilizer; wherein the section stabilizer includes a base structure; wherein the base structure is attached to a vertical support; and wherein the vertical support is attached to a lateral support pin.

Variation 2 may include the product of Variation 1 wherein the base structure includes a planar upper portion and a planar lower portion; wherein the planar upper portion is constructed and arranged to be inserted into a hole in a hollow section of a vehicle structure; and wherein the lower portion extends a distance greater than a diameter of the hole in the vehicle structure.

Variation 3 may include a product as set forth in any of Variations 1-2 wherein the lower portion of the base structure is rectangular.

Variation 4 may include a product as set forth in any of Variations 1-2 wherein the lower portion of the base structure is circular.

Variation 5 may include a product as set for in any of Variations 1-4 wherein the lower portion of the base structure is constructed and arranged to accommodate an underbody bracing attachment, a jack, or a hoist pad.

Variation 6 may include a product as set forth in any of Variations 1-5 wherein the lateral support pin is cylindrical and includes a pair of opposing planar end surfaces; and wherein the opposing planar end surfaces include a chamfer.

Variation 7 may include a product as set forth in any of Variations 1-6 wherein the lateral support pin is constructed and arranged to fit securely between a pair of opposing sides of a hollow structure of a vehicle.

Variation 8 may include a product as set forth in any of Variations 1-7 wherein the section stabilizer is a single component.

Variation 9 may include a product as set forth in any of Variations 1-8 wherein the section stabilizer is casted.

Variation 10 may include a product as set forth in any of Variations 1-9 wherein the section stabilizer is constructed and arranged to provide reinforcement to a hollow structure of a vehicle body.

Variation 11 may include a product as set forth in any of Variations 1-10 wherein the section stabilizer is inserted into the hollow structure via a hole in the hollow structure and rotated so that it is secured between a pair of opposing walls of the hollow structure.

Variation 12 may include a product as set forth in any of Variations 1-11 wherein the section stabilizer is attached to a hollow structure of a vehicle.

Variation 13 may include a product as set forth in any of Variations 1-12 wherein each of the opposing planar end surfaces of the lateral support pin are attached to each of the opposing walls of the hollow structure of the vehicle via a flow drill screw.

Variation 14 may include a product as set forth in any of Variations 1-12 wherein the opposing planar end surfaces of the lateral support pin are attached to the opposing sides of the hollow structure of the vehicle via welding.

Variation 15 may include a product as set forth in any of Variations 1-14 wherein the base structure is welded to an outer wall of the hollow structure.

Variation 16 may include a product as set forth in any of Variations 1-15 wherein the section stabilizer comprises aluminum and the hollow structure comprises aluminum; and wherein each of the opposing planar end surfaces of the lateral support pin are attached to each of the opposing walls of the hollow structure of the vehicle via aluminum mig welding.

Variation 17 may include a product as set forth in any of Variations 1-16 wherein the base structure is aluminum mig welded to an outer wall of the hollow structure.

Variation 18 may include a product as set forth in any of Variations 1-15 wherein the section stabilizer comprises aluminum and the hollow structure comprises steel; and wherein the opposing planar end surfaces of the lateral support pin are attached to the opposing walls of the hollow structure of the vehicle via flow drill screws.

Variation 19 may include a product as set forth in any of Variations 1-15 wherein the section stabilizer comprises steel and the hollow structure comprises steel; and wherein each of the opposing planar end surfaces of the lateral support pin are attached to each of the opposing walls of the hollow structure of the vehicle via steel mig welding.

Variation 20 may include a product as set forth in any of Variations 1-15, or 19 wherein the base structure is steel mig welded to an outer wall of the hollow structure.

The above description of select examples of the invention is merely illustrative in nature and, thus, variations or variants thereof are not to be regarded as a departure from the spirit and scope of the invention.

What is claimed is:
1. A product comprising:
a section stabilizer;
wherein the section stabilizer includes a base structure;
wherein the base structure is attached to a vertical support;
wherein the vertical support is attached to a lateral support pin, wherein the lateral support pin is constructed and arranged to provide lateral support to a hollow section, and wherein the base structure includes a planar upper portion and a planar lower portion;

wherein the planar upper portion is constructed and arranged to be inserted into a hole in the hollow section of a vehicle structure; and wherein the lower portion extends a distance greater than a diameter of the hole in the vehicle structure.

2. The product of claim 1 wherein the lower portion of the base structure is rectangular.

3. The product of claim 1 wherein the lower portion of the base structure is circular.

4. The product of claim 1 wherein the lower portion of the base structure is constructed and arranged to accommodate an underbody bracing attachment, a jack, or a hoist pad.

5. A product comprising:
a section stabilizer;
wherein the section stabilizer includes a planar base structure;
wherein the base structure is attached to a vertical support;
wherein the vertical support is attached to a lateral support pin, wherein the lateral support pin is constructed and arranged to provide lateral support to a hollow section; wherein the lateral support pin is cylindrical and includes a pair of opposing planar end surfaces; and
wherein the opposing planar end surfaces include a chamfer, wherein each of the opposing planar end surfaces abuts against an opposing side of the hollow section, and of the lateral support pin only the planar end surfaces contact the hollow section.

6. The product of claim 5 wherein the lateral support pin is constructed and arranged to fit securely between the pair of opposing sides of the hollow section of a vehicle.

7. A product comprising:
a section stabilizer;
wherein the section stabilizer includes a base structure;
wherein the base structure is attached to a vertical support;
wherein the vertical support is attached to a lateral support pin, wherein the lateral support pin is constructed and arranged to provide lateral support to a hollow structure; and
wherein the section stabilizer is constructed and arranged to be inserted into the hollow structure via a hole in the hollow structure and rotated so that it is secured between a pair of opposing walls of the hollow structure to provide reinforcement to the hollow structure of a vehicle body.

8. The product of claim 7 wherein the section stabilizer is a single component.

9. The product of claim 7 wherein the section stabilizer is casted.

10. The product of claim 7 wherein a pair of opposing planar end surfaces of the lateral support pin are attached to each of the opposing walls of the hollow structure of the vehicle body via a flow drill screw.

11. The product of claim 7 wherein a pair of opposing planar end surfaces of the lateral support pin are attached to the opposing walls of the hollow structure of the vehicle body via welding.

12. The product of claim 7 wherein the base structure is welded to an outer wall of the hollow structure.

13. The product of claim 7 wherein the section stabilizer comprises aluminum and the hollow structure comprises aluminum; and wherein a pair of opposing planar end surfaces of the lateral support pin are attached to each of the opposing walls of the hollow structure of the vehicle body via aluminum mig welding.

14. The product of claim 13 wherein the base structure is aluminum mig welded to an outer wall of the hollow structure.

15. The product of claim 7 wherein the section stabilizer comprises aluminum and the hollow structure comprises steel; and wherein a pair of opposing planar end surfaces of the lateral support pin are attached to the opposing walls of the hollow structure of the vehicle body via flow drill screws.

16. The product of claim 7 wherein the section stabilizer comprises steel and the hollow structure comprises steel; and wherein a pair of opposing planar end surfaces of the lateral support pin are attached to each of the opposing walls of the hollow structure of the vehicle body via steel mig welding.

17. The product of claim 16 wherein the base structure is steel mig welded to an outer wall of the hollow structure.

* * * * *